United States Patent [19]

Stobbe et al.

[11] 3,770,239
[45] Nov. 6, 1973

[54] LIQUID FLOW CONTROL ARRANGEMENT

[75] Inventors: Richard P. Stobbe, Haines City; Richard V. Knapp, Winter Haven, both of Fla.

[73] Assignee: Nilsen Mfg. Co., Haines City, Fla.

[22] Filed: June 12, 1972

[21] Appl. No.: 262,927

Related U.S. Application Data

[62] Division of Ser. No. 120,229, March 2, 1971, Pat. No. 3,700,904.

[52] U.S. Cl. .................................................. 251/9
[51] Int. Cl. .............................................. F16k 7/06
[58] Field of Search .................................. 251/4–10

[56] References Cited
UNITED STATES PATENTS 2,827,257   3/1958   Becker et al.......................... 251/9
2,835,252   5/1958   Mauchel ............................. 251/9 X
3,544,060   12/1970  Stoltz et al........................... 251/9

Primary Examiner—Martin P. Schwadron
Assistant Examiner—Richard Gerard
Attorney—George B. Oujevolk

[57] ABSTRACT

A monitor arrangement for controlling liquid flow rate in a line which passes before drop sensing means which sense the passage of drops. Drop trigger means are coupled to and responsive to the drop sensing means and provide an output pulse at the passage of each drop. Triggered by this output pulse are time trigger means which provide a pulse of a predetermined time interval. Logic and comparison means are coupled to said drop and time trigger means to judge the flow rate and motor means are in turn driven by said logic and comparison means. A line valve is responsive to the motor means which regulates the liquid flow in the valve.

2 Claims, 10 Drawing Figures

FIG. 1d (TABLE 1)

| DROP | RATE | SLAVE |         |
|------|------|-------|---------|
| 1    | 0    | 0     | (OPEN)  |
| 1    | 0    | 1     | (OK)    |
| 1    | 1    | 0     | (CLOSE) |

LIQUID FLOW CONTROL ARRANGEMENT

This is a division, of application Ser. No. 120209, filed Mar. 2, 1971 and now U.S. Pat. No. 3,700,904.

BACKGROUND OF THE INVENTION

The present invention relates to a liquid flow control arrangement and more particularly to a liquid flow control arrangement where the liquid flow is in small quantities and the instrument described herein may be useful as a venoclysis regulator.

BRIEF DESCRIPTION OF THE PRIOR ART

At present, several venoclysis regulators are commercially available. In its simplest form, the regulator may be merely an adjustable clamp placed on the liquid delivery tube. Such an arrangement is crude and its usefulness varies with the skill of the technician doing the laboratory work. Other devices are more useful having a drop counter and displaying the flow rate in digital form, e.g., ml per hour. In still other arrangements, an alarm is provided if the feed rate exceeds or is below a predetermined quantity per hour. In all of these systems presently available, certain defects exist which prevent the instrument from providing correct information under many circumstances and which furthermore provide false information dangerous to hospital patients undr certain circumstances.

Except for the very crude arrangement using only a clamp, most commercially available liquid flow monitoring instruments will have the flowing liquid pass before sensing means in drop quantities, and, at first glance it seems a simple task to design a device which will count the number of drops in a given time period. One of the first difficulties encountered is whether or not the sensing means see a drop or is the sensing means receiving an extraneous light signal which is providing a false reading. Since all drops are not clear liquid, e.g., sometimes the instrument is used with blood, the sensing means must function over a broad range of drop characteristics as to size and opacity. Also, the instrument must be operable in many places other than in shielded sick rooms. places where, for instance, the sensing means will be exposed to extraneous light as from flashlights of technicians, 60 cycle flicker of fluorescent lighting, paper charts in the nurses hands, etc. The sensing means must therefore have the ability to distinguish between the disturbance of the light as seen by the photoelectric cell as produced by a falling drop of fluid from that produced by any other means.

Furthermore, the flow of a liquid in a narrow tube depends on the hydrostatic reaction between the tube and the liquid, e.g., the capillary propensities of the tub, the adhesion and viscosity of the liquid, the temperature of the liquid, etc., and, one of the most common problems encountered will be that of liquid adhesion to the sensing means and condensation on the inside surfaces of the drip chamber in front of the sensing means caused by splash from the falling drops. Since the instrument is designed for use with a great variety of liquids, the problem cannot readily be solved merely be a chemical surface coating on the sensing means which repels the liquid, e.g., a silicone substance in the case of a water-type liquid. It must be anticipated that in many cases, liquid often clings to and sometimes fogs the inside of the drip chamber wall thus restricting the visibility of the sensing means. This condition could increase in magnitude to a point where a sensing means would fail to detect the drop. This would result in erroneous data and faulty control.

Still another problem is to control the liquid flow automatically. Assuming that the sensing means properly senses the drops, the instrument then needs a servo loop to properly control the liquid flow rate to agree with a predetermined setting. Also, in the event of stoppage of flow, as when the bottle is empty, to provide an alarm.

SUMMARY OF THE INVENTION which regulates

Generally speaking, the present invention contemplates a monitor arrangement for controlling liquid flow rate in the form of drops falling in line which passes before drop sensing means which sense the passage of drops. Drop trigger means are coupled to and responsive to the drop sensing means and provide an output pulse at the passage of each drop. Triggered by this output pulse are time trigger means which provide a pulse of a predetermined time interval. Logic and comparison means are coupled to said drop and time trigger means to judge the flow rate and motor means are in turn driven by said logic and comparison means. A line valve is responsive to the motor means whicl- regulates the liquid flow in the valve.

The invention as well as other objects and advantages thereof will be more apparent from the following detailed description when considered together with the accompanying drawings in which:

" FIG. 1d shows a truth table;

DETAILED DESCRIPTION

LOGIC FIGS. 1, 1a, 1b, 1c, 1d

To first understand the operation of the instrument, it is advantageous to appreciate the logical determinations which are first made by the instrument. Having an understanding of the instrument logic, it is then possible to follow the block diagram explanation of the instrument, which will provide the function of the several components cooperating in carrying out the desired functions. After this, it is then possible to explain the circuitry of each of the individual components which will cause these components to perform their functions.

Figure 1:
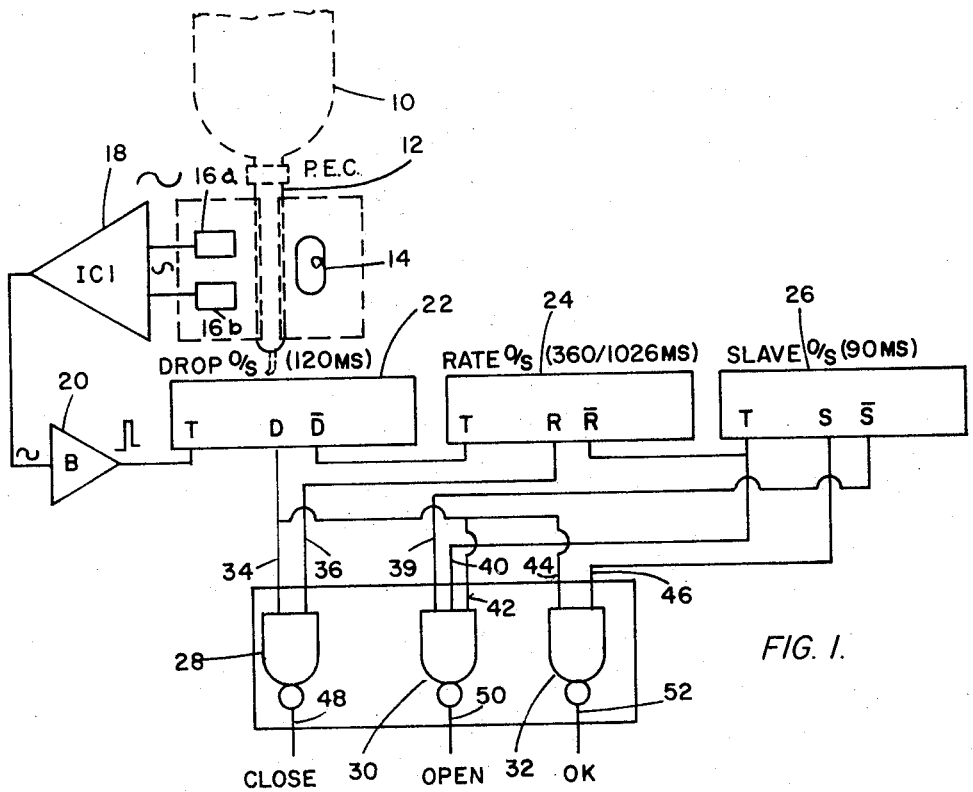
FIG. 1 is a block schematic diagram of the logic circuitry contemplated herein.
Figures 1A, 1B, 1C:
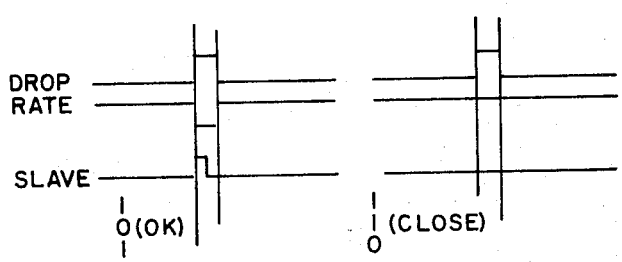
FIG. 1a represents the applicable binary output waveforms from the DROP and SLAVE one-shots also the resulting NAND gate output and the truth table for the condition "OK;"
FIG. 1b represents the applicable binary output waveforms from the DROP and RATE one-shots, also the resulting NAND gate output and the truth table for the condition "Close;"
FIG. 1c represents the applicable binary output waveforms from the DROP, the inverted RATE, and the inverted SLAVE one shots, also the resulting truth table for the condition "Open.

Shown in FIG. 1, is a block diagram of the logic circuitry used in the instrument contemplated herein and FIGS. 1a, 1b, 1c, 1d are logic diagram waveforms and truth tables produced by the diagram of FIG. 1. The components represented by the block diagram of FIG. 1 are: a liquid container 10 with a drip chamber 12 passing between a lamp 14 and a pair of photocells 16a and 16b. The outputs of the photocells 16a and 16b are fed to a differential amplifier 18, and to the buffer amplifier 20 which is the interface element between the differential amplifier 18 and the drop one-shot 22.

The trigger means consisting of three monostable multivibrators 22, 24, 26, also known as "one-shots," and marked with the legends DROP, RATE and SLAVE. Associated with the three multivibrators or one-shots are three NAND gates 28, 30, 32. Those skilled in the art will readily understand that the use of a NAND gate or AND gate is merely a matter of circuitry designs and one can be substituted for the other by redesigning the logic. The situation depicted in the wave form figures, FIGS. 1a to 1c relates to the second and subsequent drops and its time relationship to the previous drop of liquid. Only three possible situations exist: (1) the subsequent drop is on time or OK; (2) the subsequent drop arrives too soon in which case it is necessary to close the clamp thereby decreasing the liquid flow; (3) the subsequent drop arrives too late in which case it is necessary to open the clamp thereby increasing the liquid flow. The situations will be determined by the logic block acting upon various states of the one-shots during the drip pulse time interval. At the conclusion of the drip pulse, i.e., the trailing edge of the waveform, the system is reset. The reset is accomplished by re-triggering the RATE one-shot 24 so that the pre-set time period is started again.

Going back now to FIG. 1, it is noted that the container 10 is above the two photocells and that the drop forming chamber passes vertically before the two photocells 16a and 16b. Thus, the drop will pass first before photocell 16a and at a later time period before photocell 16b. Any ambient light will strike both photocells 16a and 16b simultaneously. Therefore, since the output of the differential amplifier 18 is the difference in signal outputs from photocells 16a and 16b, it follows that when the first drop passes 16a there will be a positive signal which will peak, i.e., reach a maximum at a time when the drop fully covers photocell 16a, and will decrease as the drop continues to fall to zero when the drop is equally covering photocells 16a and 16b. The output of differential amplifier 18 will change polarity and reach a peak at the opposite polarity at the time the drop covers photocell 16b. Thus, any light which originates outside the drop forming chamber will have little effect on the output since this will effect both cells equally. In addition, should a droplet or fog cover only one cell there will be no output from the differential amplifier 18 since the photocell outputs are capacitively coupled to the differential amplifier and couple only rapid changes such as would be produced by the passing of a drop.

the signals from the photocells 16a and 16b, approximately like a cosine waveform in character, are combined in the differential amplifier 18 and further processed in the buffer amplifier 20 so as to insure positive triggering of the DROP monostable multivibrator (herein called a one-shot). The first one-shot 22 triggers off another square wave into the second one-shot 24 which serves as the time reference and the second one-shot 24 then triggers off another square wave into the third one-shot 26 herein termed the SLAVE one-shot. As is well known and conventional, the input line to the one-shots is identified as T (trigger), and the outputs are identified as D and $\bar{D}$ from the DROP one-shot, R and $\bar{R}$ from the RATE one-shot, and S and $\bar{S}$ from the SLAVE one-shot. Associated with the three one-shots are three NAND gates 28, 30, 32 with inputs 34, 36, for gate 28; 38, 40 for gate 30; 44, 46 for gate 32; and outputs 48, 50, 52 respectively for gates 28, 30, 32.

The first one-shot 22 may be considered as the DROP one-shot; the second one-shot 24 is the RATE one-shot; the third one-shot 26 is termed the SLAVE one-shot which is triggered by the RATE one-shot. Although these time periods are not critical, in a practical instrument, the DROP one-shot is of 120 millisecond duration, and the SLAVE one-shot is of 90 millisecond duration. The RATE one-shot is set by the flow rate control and thus will provide pulses of varying width depending on the setting. In a typical unit, this may vary between 360 and 2000 milliseconds. The DROP one-shot 22 is connected from the D output to inputs 34, 42, and 44 of the NAND gates, and thus supplies a pulse to all three NAND gates. The RATE one-shot 24 is connected from the R output to gate 30, input 40, so that one output is fed to the first NAND gate and the inverted output to the second NAND gate. The slave output to the third NAND gate 32 through input 46 and from $\bar{S}$ output to the second NAND gate 30 through input 39.

To repeat the foregoing, the first one-shot D output goes to the first, second, and third NAND gates; the second one-shot R output goes to the first NAND gate and the $\bar{R}$ output goes to the second NAND gate; the third one-shot S output goes to the third NAND gate, while the $\bar{S}$ goes to the second NAND gate. The first and third NAND gates have two inputs, the second NAND gate has three inputs. Since the first one-shot represents the DROP and the second one-shot the desired pre-set time between drops, an output from the first NAND gate means that the drops are passing too fast and the valve should be closed, i.e., the subsequent drop appeared during the second one-shot time period. The third one-shot supplies a signal to the third NAND gate after the pre-set time lapse. Therefore, if an input appears simultaneously from the first one-shot which represents the DROP and the third one-shot representing the previous drop, at the third NAND gate, then, the drops are passing on time and the flow rate is OK which is the output provided by the third NAND gate. The second one-shot represents the rate, and all three one-shots are connected to the second NAND gate so that if the drops are flowing too slowly the valve should be opened.

The foregoing situation is given in truth tables which are shown in the drawing for convenience of understanding. Furthermore, to enhance the accuracy of the device, it is also possible to use a drop period averaging arrangement, e.g., 3 register operating over a span of at least two drop periods.

BLOCK DIAGRAM DESCRIPTION FIG. 2

Figure 2:
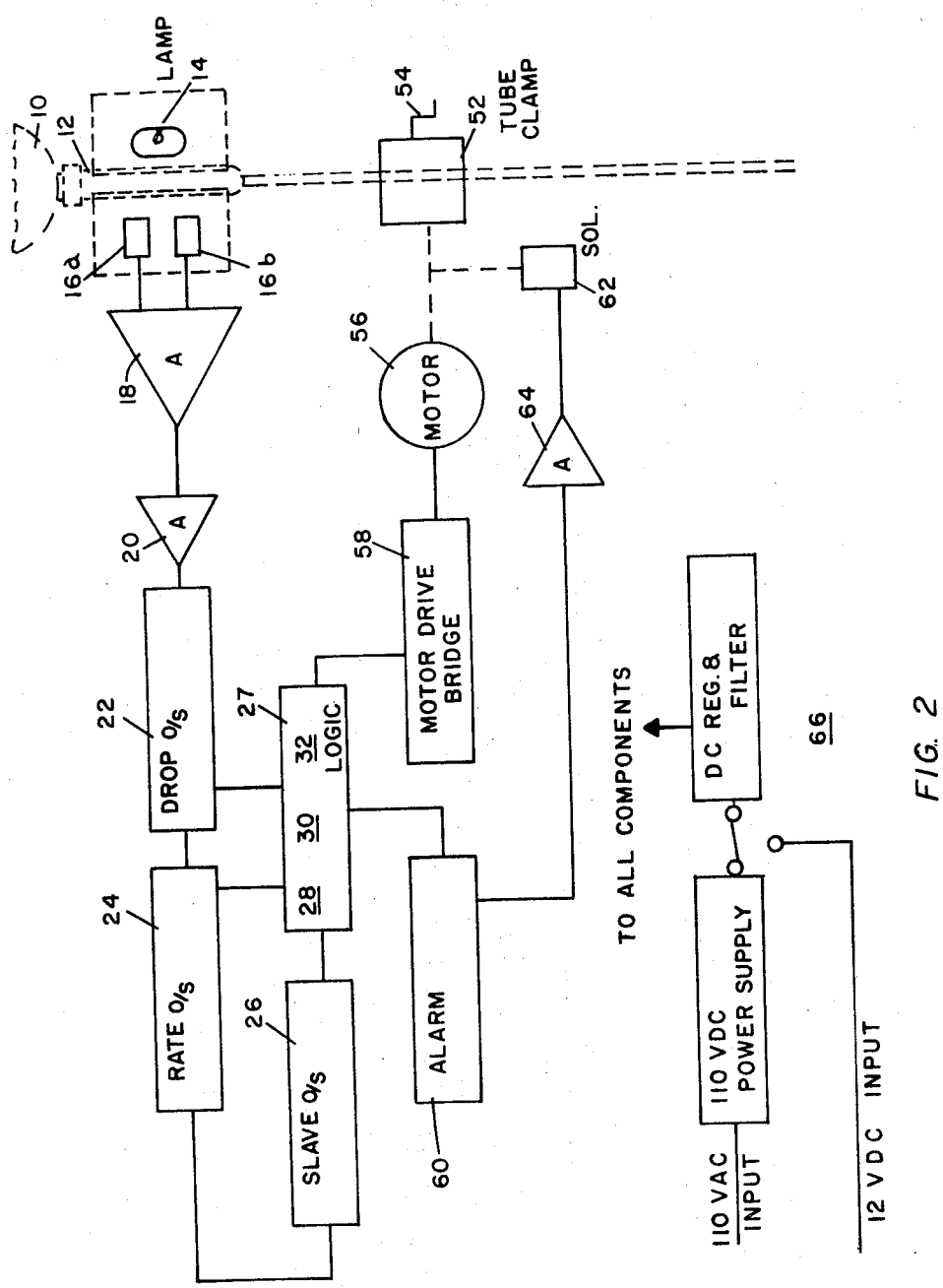
FIG. 2 is a block diagram of the entire instrument contemplated herein.

With the foregoing understanding of the logic used herein, it is possible to understand the block diagram of the arrangement herein contemplated and depicted in FIG. 2. Here, the container 10 is repeated with the drip chamber 12 shown passing before the sensing means consisting of lamp 14 and photocells 16a and 16b. As previously explained, the photocell output is fed to the differential amplifier 18, interface buffer amplifier 20, three one-shots 22, 24, 26, which in turn are coupled to the logic 27 consisting of NAND gates 28, 30, 32 (the expression NAND gate also broadly including an AND gate). Mention heretofore has been made of a valve which is shown in block diagram as a tube clamp 52. The tube clamp 52 has a manual control 54 and is also motor controlled by motor 56 which in turn is driven by motor drive bridge 58. The motor 56 is geared down to about 1 rpm and will run only a maximum of the DROP one-shot period for each drop. Motor drive bridge 58 is in turn controlled by logic 27, namely by the three NAND gates 28, 30, 32 which either will inhibit motor drive, drive the motor to close the clamp or drive the motor to open the clamp. The instrument also has an alarm 60 which is enabled by the logic, an alarm solenoid component 62 to shut the flow of liquid and an amplifier 64 to the solenoid. The power supply is shown as block 66.

Figure 3A:
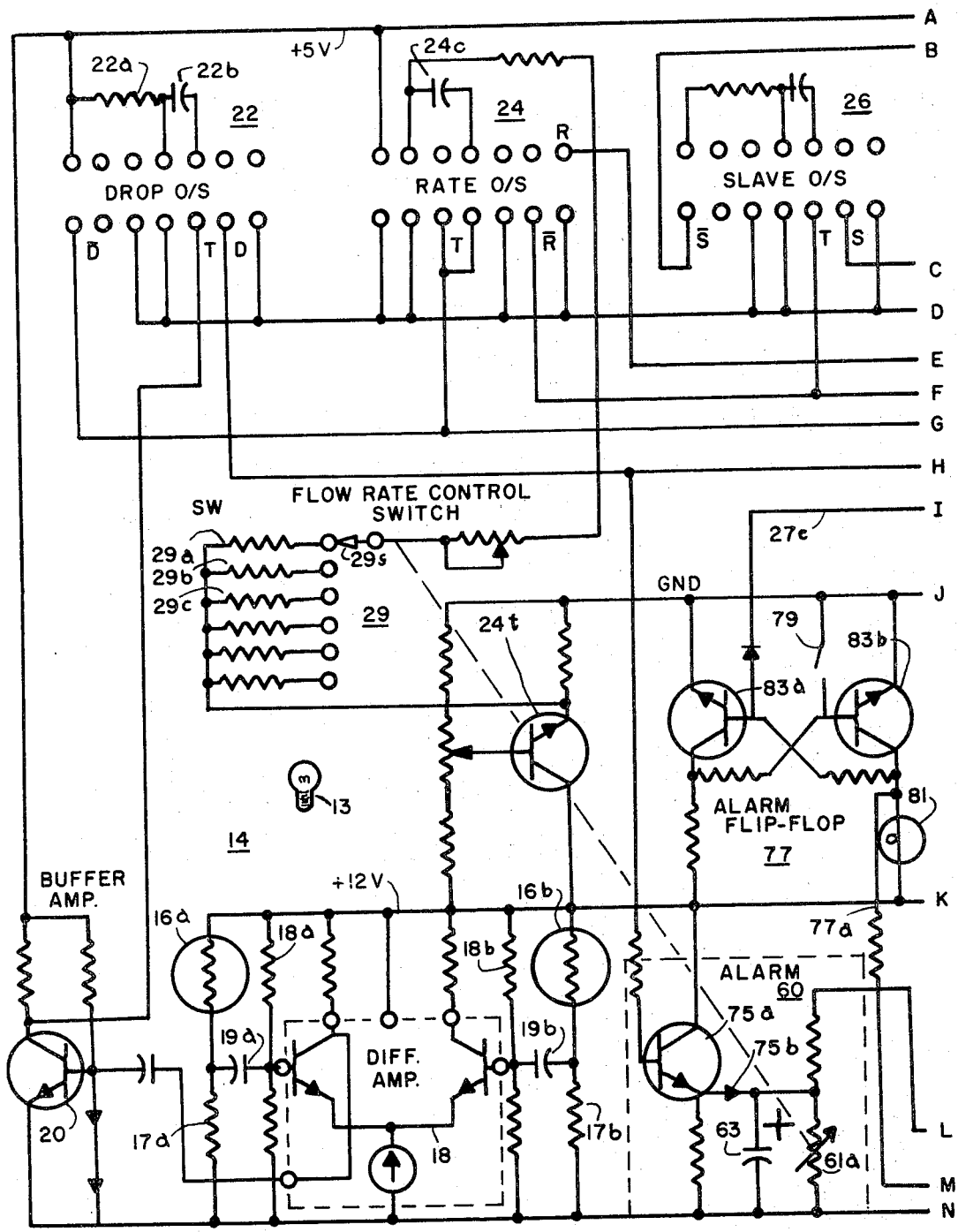
FIGS. 3a and 3b show a schematic explanation and diagram of the instrument contemplated herein.
Figure 3B:
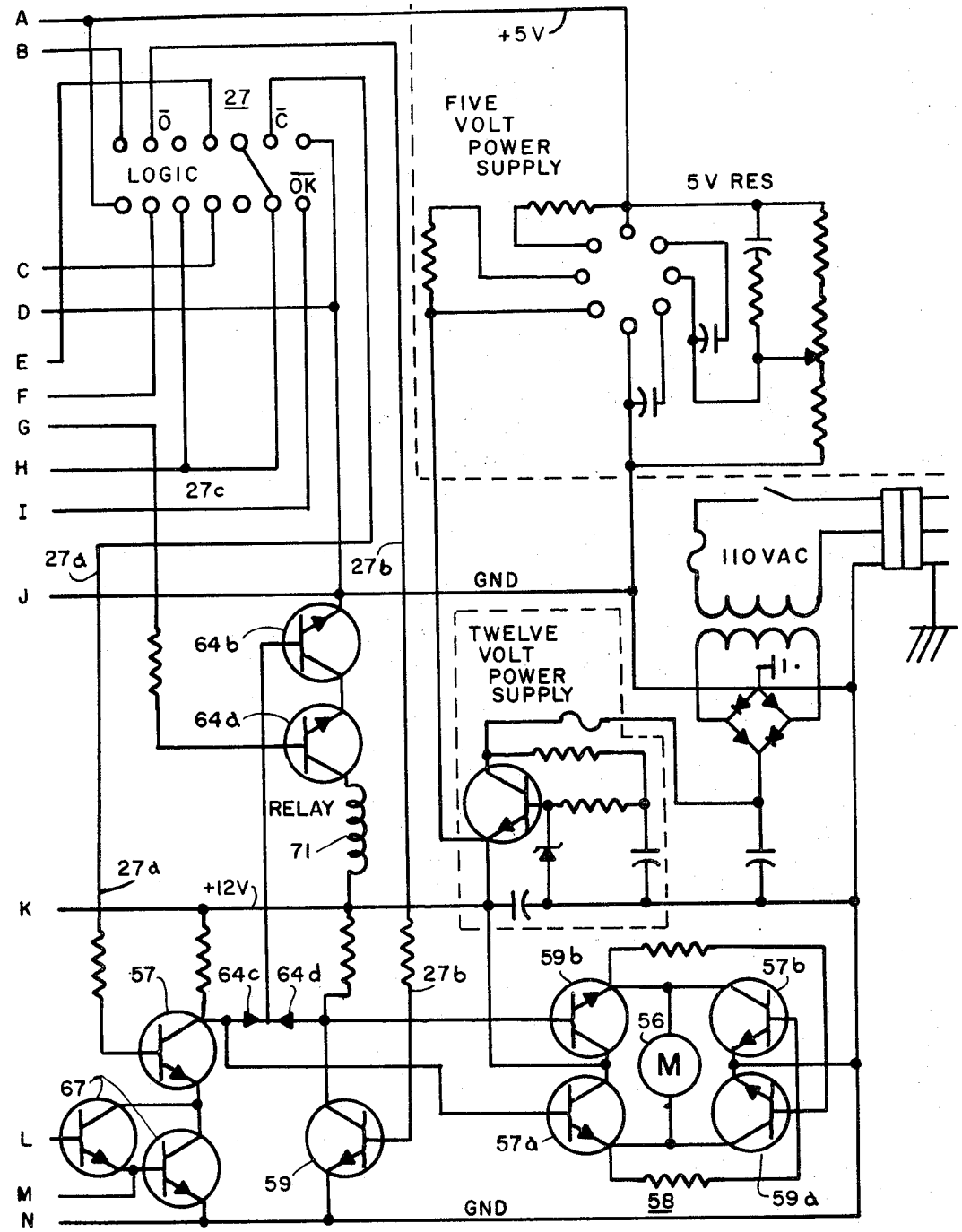

CIRCUITRY FIGS. 3a, 3b

In the middle of the schematic wiring diagram 3a is shown lamp 14 which consists of a standard incandescent bulb 13. Opposite the light bulb 13 at the bottom of FIG. 3a of the schematic drawing, are the two photocells 16a, 16b. Each cell has a cell bias resistor 17a, 17b. Thus, with light from bulb 13 illuminating the cells, the cells are balanced and no output signal is emitted. The cell circuitry also includes AC coupling capacitors 19a, 19b, which prevent the differential amplifier 18 from going into saturation in the event the level of illumination to the photocells is unbalanced as when condensation occurs on the drip chamber interior surface. The photoelectric cells 16a and 16b also have appropriate biasing resistors 17a and 17b, the capacitors 19a, 19b providing the coupling into the differential amplifier 18 which also has appropriate bias resistors 18a and 18b. Load resistors are also shown. The photocells and the differential amplifiers are commercially available units and the differential amplifier is sold as an integrated circuit. The output of the differential amplifier 18 goes to the buffer amplifier 20. The buffer amplifier includes a transistor and other appropriate circuitry which together with the succeeding stage DROP one-shot 22 includes timing RC resistor 22a, capacitor 22b. This unit and the succeeding one-shots are commercially available integrated circuit catalog items. The three one-shots 22, 24, 26 have already been described in connection with the explanation of the logic in FIGS. 1, 1a, 1b and 1c. The second one-shot 24 is connected to switch flow rate control 29 having resistors 29a, 29b, 29c, etc., and a switch 29s. By turning the switch 29s to the appropriate resistors, the RC of the second one-shot 24 may be varied to desirable time settings. A further calibration adjustment of the RATE one-shot is provided by a transistor 24t connected to switch 29s and RATE one-shot 24.

Logic 27 has also been previously explained and since gating circuitry explanation is well understood by those skilled in the art, and the units used for the three NAND gates are commercially available, circuit details are omitted. As shown, there are three output lines from the logic 27. Lines 27a and 27b go to the motor drive bridge 58. Line 27c is the OK line and by-passes bridge 59. Line 27c also is an alarm reset line and will be discussed in connection with alarm conditions. Lines 27a and 27b each lead to a driver transistor in bridge 58, line 27a going to driver transistor 57 while line 27b goes to driver transistor 59. Driver transistors 57 and 59 operate transistors 57a, 57b, and 59a, 59b. These transistors in turn form the motor drive bridge and cause the motor 56 to turn in the one or the other direction. The motor 56 is geared down to drive the clamp screw at about 1 rpm.

The alarm 60 includes variable resistor 61a, which is ganged to the switch flow rate control 29 and capacitor 63. These components will act on the alarm solenoid 62 which will release a spring acting on clamp 52 shown in FIG. 2, so as to shut the liquid flow. The other components in the alarm system are the amplifier transistors 64a and 64b, the compound-alpha circuit transistors 67 (also known as Darlington Coupling) into the alarm resistor diodes 64c, and 64d. The alarm disable flip-flop circuit 77 and its associated alarm reset line 27c connecting the alarm disable circuit and the logic 27.

As previously explained, the time lapse of the second one-shot 24 depends on the setting of the flow rate control switch 29. Ganged with this switch is alarm resistor 61a, which together with alarm capacitor 63 set the alarm time. The alarm also includes an input transistor 75a and diode 75b. The alarm delay time period is set by the alarm RC circuit and is somewhat longer than the time lapse setting between drops for the same setting by the flow rate RC circuit.

The DROP one-shot output D is coupled to transistor 75a and diode 75b to capacitor 63. Capacitor 63 is discharged through 61a. The charge on capacitor 63 is sensed by the compound-alpha transistor 67. When this charge drops to a low level, the transistors are returned to a non-conducting state, causing the voltage at the driver transistor 57 to increase, and is coupled through diode 64c to the base of transistor 64b. This causes transistor 64b to conduct through transistor 64a, which is allowed to conduct any time the DROP one-shot is not in a timing cycle, thus completing the circuit through the alarm relay coil 71. A switch is then operated completing a trigger circuit allowing current to flow to an alarm solenoid 62 and tripping the spring loaded clamp 52. When the clamp is released, it overrides the control setting on the tube clamp established in normal operation and clamps the tube off and stops the flow completely. This trip action also operates a switch which removes the +12 volt power from the control circuitry and applies it to the alarm lamp 95.

A second switch is also operated at the same time and its terminals are made available for external alarm circuits.

Since transistor 64b is enabled also in the normal control process, every time the logic gate issues a CLOSE or OPEN command, the alarm circuit is inhibited by transistor 64a which is turned off every time the DROP one-shot is "on" and this occurs at precisely the same time as the CLOSE or OPEN transistor in on, thus if the liquid flow is interrupted long enough for the capacitor 63 to discharge, the alarm circuit would be activated.

Under conditions in actual use, the alarm conditions could be satisfied erroneously during the set-up or start of the regulator before the servo balance has been established. This could become a nuisance factor. In order to overcome this factor, an alarm latch circuit 77 is used in which the components are selected such that when the power is turned on, the bistable multivibrator transistor 83a is conducting which clamps transistor 83b "off." The "alarm enabled" lamp 81 is turned off and line 77a is at + voltage which is coupled to the compound-alpha circuit 67 clamping the output transistor in a conducting state which prevents the alarm circuit from operating so long as the bistable alarm latch is in this state. When the period between drops coincides with the preset rate, this latch receives a pulse from the logic gate on line 27c and causes the alarm latch transistor 83b to conduct, turns on the "enabled" lamp 81, clamps transistor 83a base, and the line 77a to the compound-alpha circuit to ground. This serves two purposes, namely, the alarm bistable latch is clamped in the enable state, and the ground line is coupled through a suitable resistor to the emitter-base junction of the compound-alpha transistor 67, enabling it to sense the capacitor 63 voltage and stabilize the transistor pair. If the normally open switch 79 is pushed, the alarm latch is again placed in the "alarm disabled" state, but automatically resets itself the first time a drop falls in the correct time period. This feature eliminates the possibility of human error in forgetting to reset the alarm. It also serves as a visual indication that the regulator is in control.

MECHANICAL FEATURES

Figure 4:
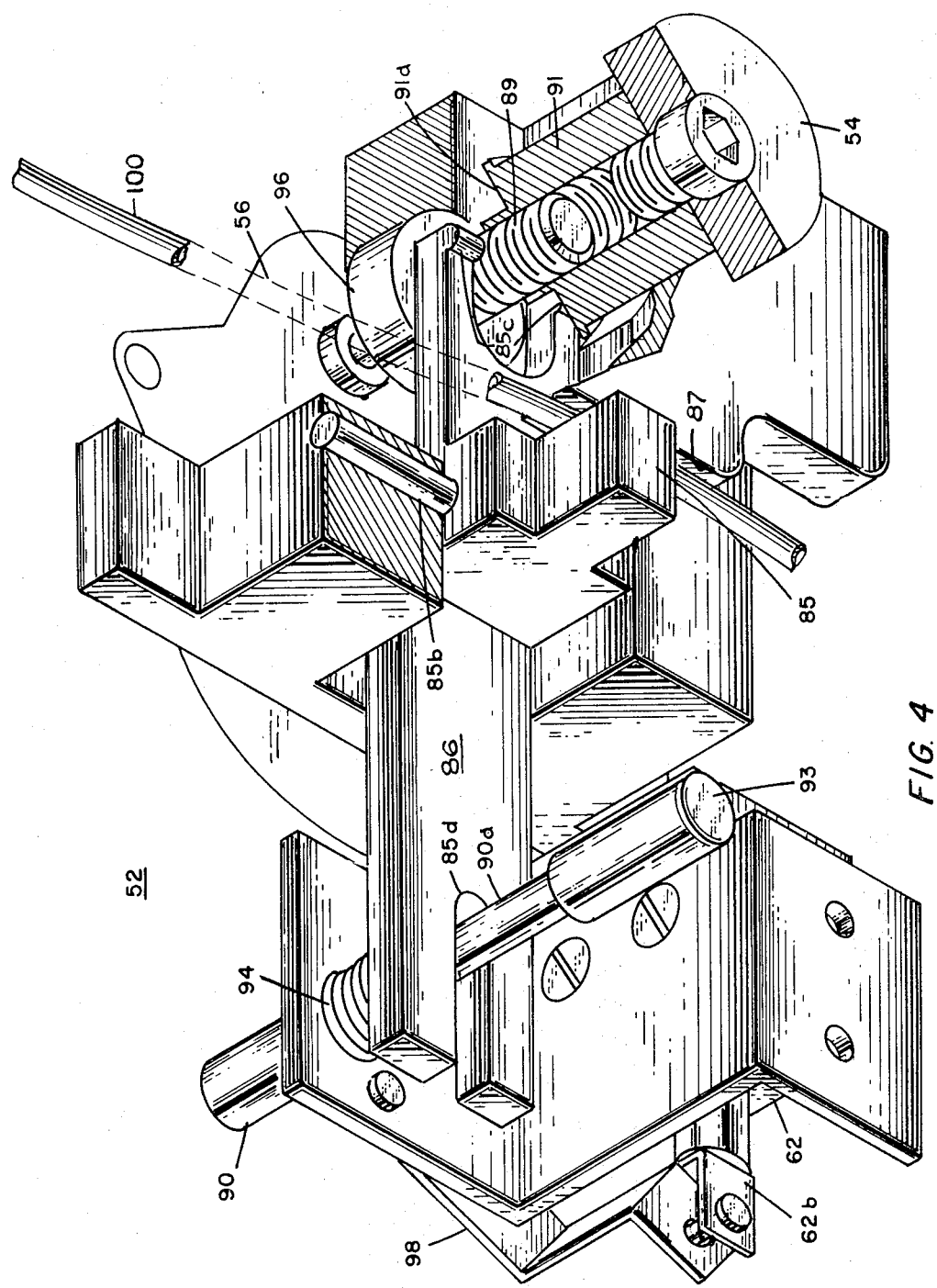
FIG. 4 is an explanation of the clamp setting arrangement.

Line clamp 52, as shown in FIG. 4, consists of one fixed jaw 87 and one movable jaw 85 rigidly secured to, or integral with, an elongated bar 86. Jaw 85 is movable toward a tube compressing position in response to th position of threaded member 91, by virtue of the surface 91a bearing against fork surface 85c whereby bar 86 pivots on pin 85b. Threaded member 91 is engaged with screw 89 which in turn is fixed to the shaft of motor 56, through thrust bearing 96 so that this screw 89 is only free to rotate with the shaft of motor 56. The threaded member 91, on the other hand may be manually rotated by a manual knob 54 which allows member 91 to move in and out thereby controlling the clamp adjustment. The motor 56 is always free to respond to the logic commands of the system. Friction between the fork 85c and surface 91a on the threaded member 91 only allows member 91 to move in and out on the thread of the screw 89, rather than rotate, as this screw is driven by the motor thereby controlling the clamp adjustment.

Throughout the normal clamping range, the fork 85d is free to move along the surface 90a of the shaft 90. Shaft 90 is held, as shown in FIG. 4 by sear lever 98 and with spring 94 compressed. When the condition for alarm exists, solenoid 62 is energized causing plunger 62b to operate sear lever 98 thus releasing shaft 90 so that the spring 94 will drive the shaft 90, and with it fork 85d causing the clamp jaw 85 to close on the fluid line stopping the flow. The button surface 93 on shaft 90 is now extended through the control panel and acts as a visual indication as to the status of the alarm mechanism. Reset can be accomplished by depressing the surface 93 until spring 94 is again compressed and the sear lever 98 again locks the shaft 90 in the reset position.

It will be understood that pressure exerted by the tube 100 biases fork surfaces 85c against surface 91a and the shaft 90 and spring 94 cooperate whereby release of sear lever 98 allows spring 94 to drive shaft 90 axially. Thus, bar 86 pivots about pivot 85b to pinch the tube 100 shut.

In summary, the clamp may be controlled by the motor 56, the manual knob 54 which is connected to the threaded member 91, or by the spring loaded shaft 90 which only has two states, either shut down where it overrides the clamp adjustment established by fork 85c, or in the reset position where it cannot interfere with the clamp jaw at all.

Figure 5:
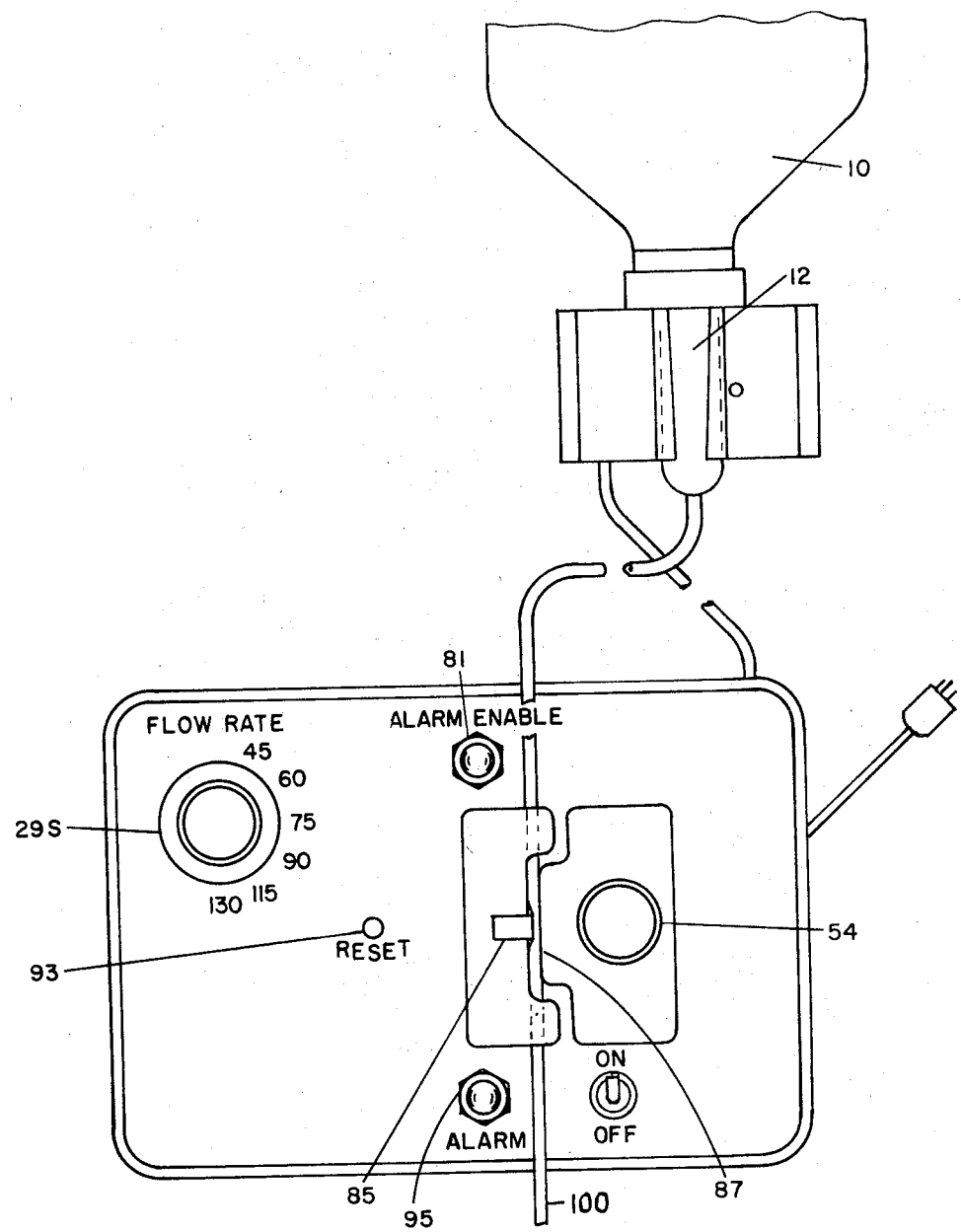
FIG. 5 shows a front view of the instrument contemplated herein.

The instrument is shown in FIG. 5 and the face plate shows the flow rate control switch 29s as a dial, the clamp jaws 85 and 87 with its manual control 54, the reset button 93, the alarm enable lamp 81, as well as an alarm lamp 95 which is lit by the alarm condition.

It is to be observed therefore, that in the present instrument an electro-mechanical arrangement replaces the usual screw type clamp and continuously makes adjustments to correct for the numerous factors that attempt to change the flow rate. A time comparison is made between the drop period and an internal reference. Digital logic circuits make the decision as to the action that must be taken to correct the flow rate and then sends a signal to the motorized clamp which completes the action. This is a type of servo loop which can only stabilize when the time period between drops is exactly what is called for by the operator when the rate control is set on the front panel. The time to "check and correct" is aproximately 0.2 seconds so even at the fastest rate, each and every drop is checked and the clamp adjusted whenever called for. A photoelectric drip-sensor head is attached to the drop forming chamber. Photoelectric cells are illuminated by a small lamp so that the drop can be detected as it falls to the fluid pool at the bottom of the chamber. The resulting electrical signal is the input to the logic section of the regulator. The instrument utilizes transistors, diodes, and integrated circuits, all solid state for cool operation, economy, and long life, and requires only standard 105–130 volt AC line and consumes approximately 12 watts.

In the present instrument, use is made of a No. 330 lamp operating at a reduced voltage to peak photocell output and increase life. The photocells are matched, positioned vertically so that the drip shadow falls on each cell at different times, and responds to ambient light equally. A a useful level. A buffer amplifier provides the interface between the differential amplifier and the DROP one-shot. A monostable multivibrator one-shot is used to further process the drop signal by cutting off the ripple associated with the drop signal, so that only one output pulse exists for each drop. The time period for this one-shot is selected so that the first ripple blanks out all the succeeding ripples for the drop, then resets and awaits the next drop. Thus, the period should be slightly longer than the time it takes for the drop to fall past the photocells. The DROP one-shot output pulse triggers the timing one-shot which is adjustable by means of the flow rate control switch. When this period is over, it triggers the SLAVE one-shot. The SLAVE one-shot functions as the OK period generator, its time is fixed and if the drop falls while the slave is in its period, the motor will not run.

For the purpose of giving those skilled in the art a better appreciation of the invention, the following illustrative example is given:

VENOCLYSIS OPERATING PROCEDURE the venoclysis set is assembled with bottle and needle, suspended from the stand and the tube purged until free of air.

The regulator control unit is clamped to the stand post, positioned so that the top clears the drip chamber. The drop sensor unit is attached to the drip chamber. The tubing is guided into the regulator clamp jaws and under the protective ledges above and below the clamp. The tube is stretched slightly to work down in the clamp jaws. It may be necessary to depress the reset button and turn the manual control c.c.w. to open the clamp jaws fully. The manual control is turned clockwise to squeeze the tube shut. All other clamps are opened. The drip chamber wall is depressed to bring the fluid level up to the line indicated on the drop sensor. The Rate control is set to the desired time to dispense 1 liter of fluid. The venipuncture made, the manual control is adjusted until a slow drip is established. The power cord is plugged in, the power switch is snapped on, the alarm disable button depressed. (When the alarm enabled light (green) comes on, the approximate rate is established.) The alarm remote cable between the alarm jack on the control unit to the "nurse call" receptacle is connected.

In the event the flow is interrupted or the bottle is empty, the alarm is activated and the tube is clamped shut with some fluid left in the drip chamber so that the tube does not require purging when changing bottles. The red lamp comes on and the nurse call circuit is activated. After the cause for the interruption is corrected or the bottle is changed, the regulated flow will start after the manual reset button is depressed.

If the patient must be moved, the power cord and the nurse call remote cable must be unplugged. The bottle and regulator can now go with the patient. The flow will continue at the established rate, but will not regulate until the power cord is plugged in again.

The alarm disable switch and the alarm enabled (green) light are both external components of the alarm system. Because of the nature of the system there are conditions when the alarm could trip needlessly so a disable switch is provided. Also, since it could be left in the disabled state by accident, a circuit that automatically enables the alarm circuit is provided. The green light shows when this alarm is ready. The mechanism that enables the alarm system to set itself is the drip that comes approximately in the correct time period. Because of this, it follows that the control system is operative. This does not mean that the drip rate is exactly correct. It may in fact take several minutes to stabilize and become accurate.

We claim:

1. A tube compressor for conrollling the flow of a liquid through a flexible tube comprising:
   a. a fixed tube compressor jaw;
   b. a moveable tube compressor jaw;
   c. pivot means mounting said moveable jaw for controlled tube compressing movement toward said fixed jaw and pressure releasing movement away from said fixed jaw;
   d. said moveable jaw including an elongated bar projecting laterally to the opposite sides of said pivot means and terminating in first and second end portions to opposed sides of the pivot means;
   e. independently operable first and second jaw actuating means engaged respectively with said first and second end portions;
   f. said first jaw actuating means comprising spring means for biasing said moveable jaw toward said fixed jaw, and latch means for selective release into biasing engagement with the first end portion of the bar of the moveable jaw;
   g. said second jaw actuating means comprising motor means drivingly engaged with the second end portion of the bar of the moveable jaw;
   h. said moveable jaw being freely moveable under the influence of either actuating means independently of the other actuating means.

2. The compressor of claim 1 wherein said motor means includes an elongated externally threaded motor shaft, and a manually adjustable positioning means for controlling the position of the moveable jaw relative to the fixed jaw, said positioning means comprising:
   an internally threaded member threadedly receivable on and adjustable along said motor shaft;
   said member having a surface bearing on the second end portion of the moveable jaw bar whereby adjustment of the positioning member on the motor shaft will effect a corresponding adjustment of the moveable jaw.

* * * * *